Sept. 5, 1944. C. I. FIELDS 2,357,463
MEANS FOR ASCERTAINING ACTUAL POSITIONING OF AUTOMOBILE WHEELS
Filed June 15, 1942 2 Sheets-Sheet 2
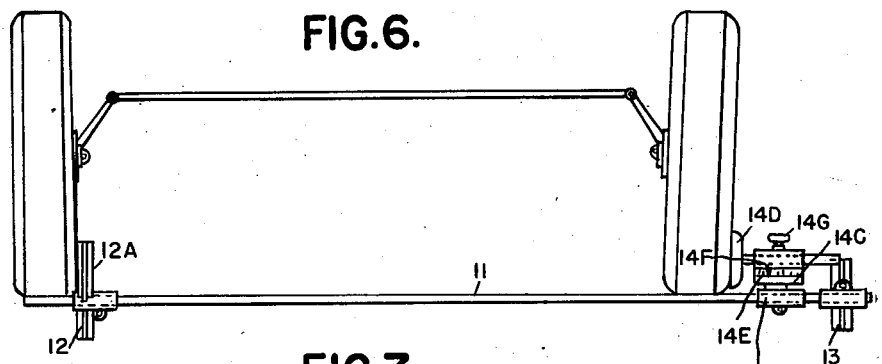
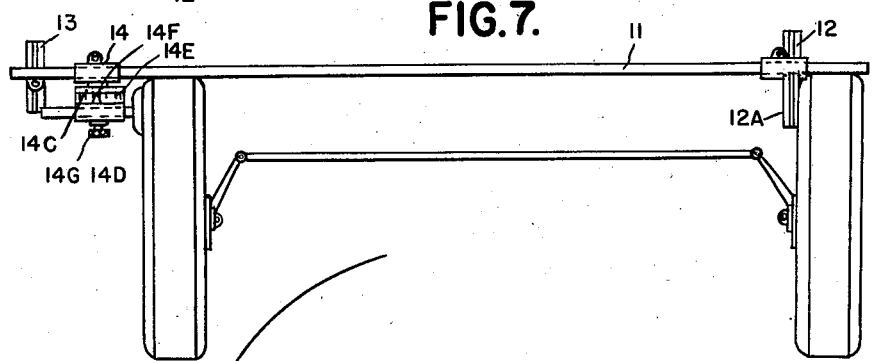
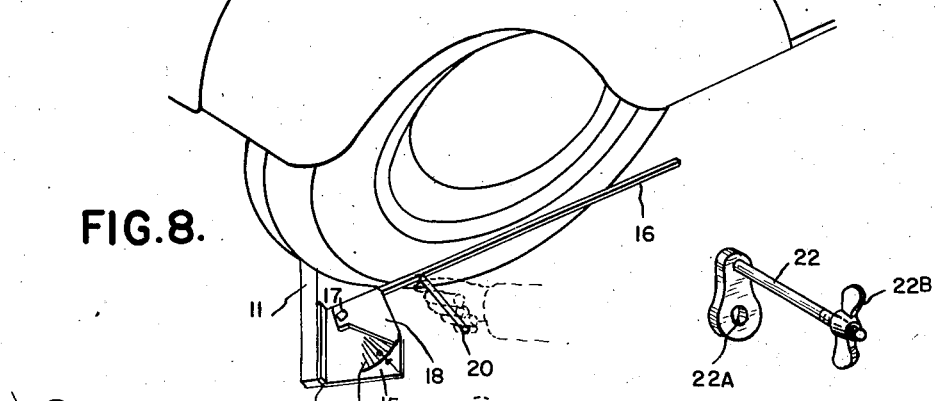
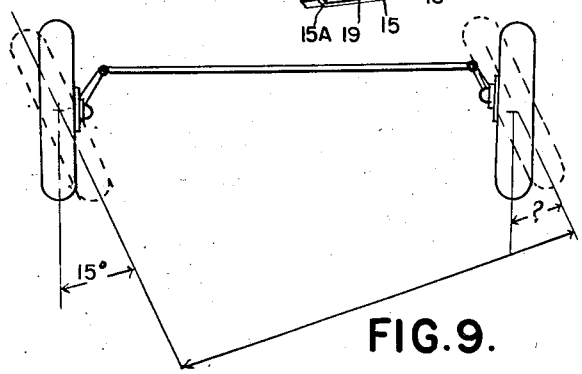
INVENTOR.
CHARLES I. FIELDS
BY
Swan, Frye & Hardesty
ATTORNEYS Patented Sept. 5, 1944

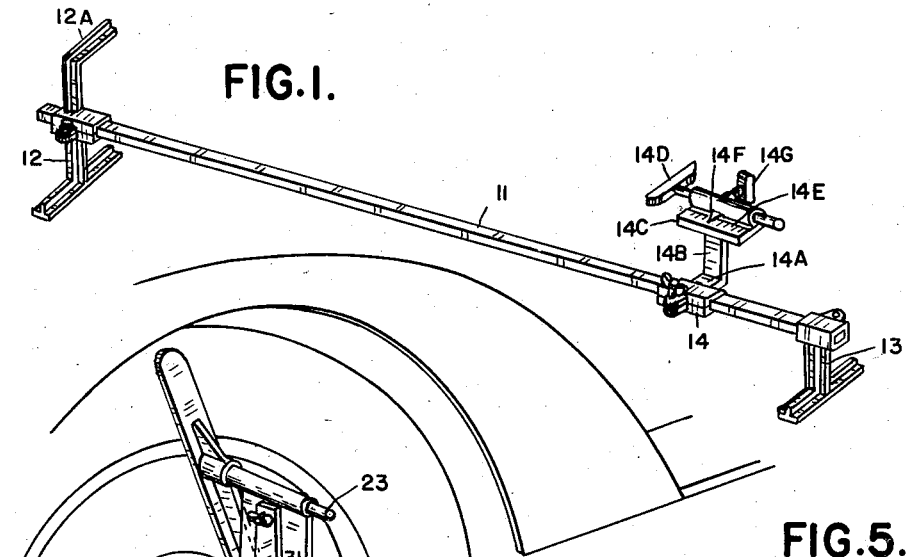
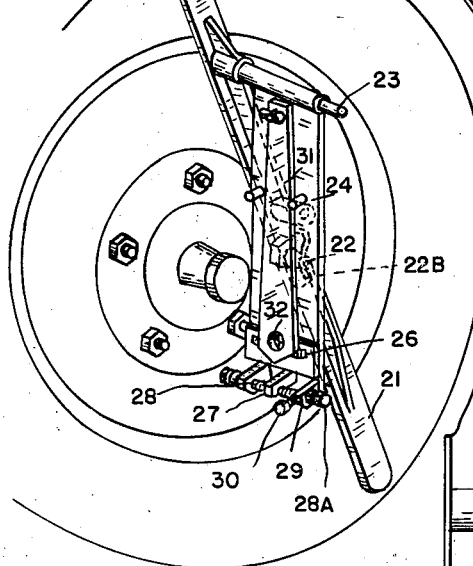
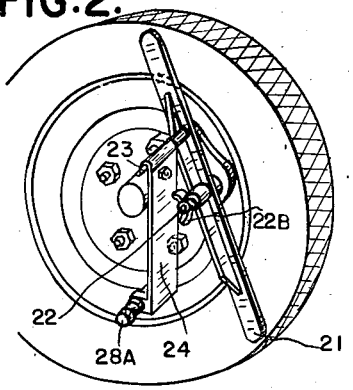
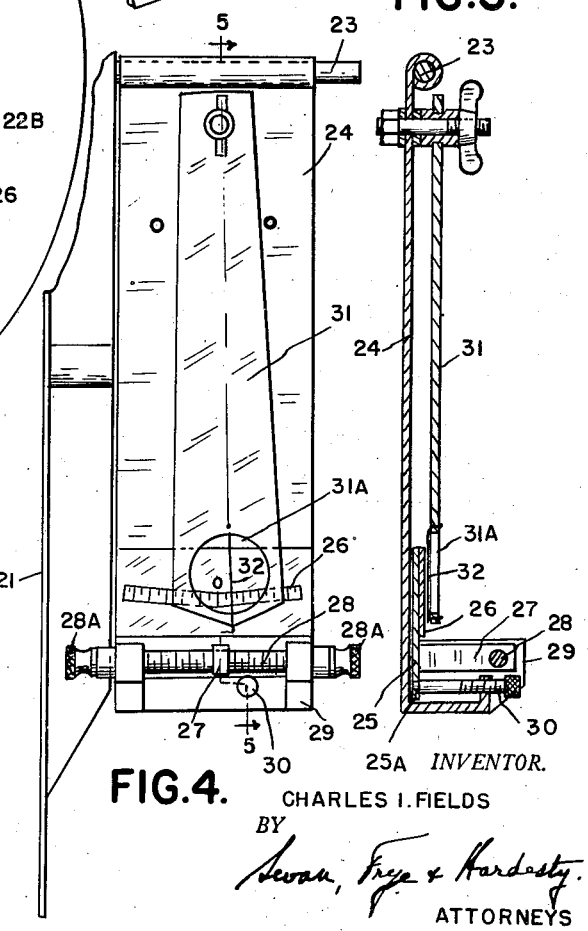

2,357,463

UNITED STATES PATENT OFFICE 2,357,463

MEANS FOR ASCERTAINING ACTUAL POSITIONING OF AUTOMOBILE WHEELS

Charles I. Fields, Detroit, Mich.

Application June 15, 1942, Serial No. 447,080

3 Claims. (Cl. 33—203)

This invention relates to means for ascertaining the actual positioning of automobile wheels, and particularly the steering wheels, with relation to desired positioning thereof, including the checking of caster and camber angles, toe-in position of both wheels, and the steering wheel geometry, whereby the variations from factory specifications, out of alignment conditions, and/or bent members, such as steering arms, can readily be found.

The principal object of my invention is provision of simple, rugged and practical means for ascertaining the actual positioning of automobile wheels without complicated calculations.

A further object is to provide such means with easily read indications whereby changes from desired positionings can readily be checked by the operator's superior or viewed by the automobile owner.

A further object of my invention is the provision of a pair of protractors adapted to be simultaneously fastened one to each front wheel of a vehicle for movement therewith during the operations necessary for determining caster and camber positions of each wheel without the necessity of using turning gauges.

Other objects and advantages will be apparent to those skilled in the art from the following description, wherein reference is made to the accompanying drawings, illustrating a preferred embodiment of my invention, and wherein similar reference numerals designate similar parts throughout the several views.

In the drawings:

Fig. 1 is a perspective view of a trammel bar with adjustable brackets and traveling gauge mounted on one of such brackets for determining toe-in and toe-out positions of wheels.

Fig. 2 is a perspective view looking towards the front of a vehicle wheel on which is clamped a protractor for use in determining caster and camber conditions of such wheel.

Fig. 3 is a perspective view similar to Fig. 2, but looking toward the rear of the wheel.

Fig. 4 is a front elevation of the protractor and associated elements, with parts broken away.

Fig. 5 is a vertical sectional view taken substantially on the line 5—5 of Fig. 4.

Fig. 6 is a plan view showing the trammel bar and attached brackets contacting the forward portions of the tires of front wheels, in position for determining toe-in of such wheels.

Fig. 7 is a view similar to Fig. 6 but with the trammel bar and brackets contacting the tire portions in the rear of the front wheels.

Fig. 8 is a perspective view showing an angle gauge in cooperating position with the trammel bar for indicating the angle to which a front wheel has been turned.

Fig. 9 is a plan view showing in diagram the steering geometry of vehicle front wheels when one wheel is turned to a definite angle, and Fig. 10 is a perspective view of one of the clamps used for securing a protractor to a front wheel.

Referring now to the drawings, the numeral 11 designates the trammel bar, herein shown as a hollow rectangular member slidably mounted in a pair of supporting brackets 12 and 13 respectively, one of the brackets, as 12, having an upward extension terminating in a portion 12A bent at substantially right angles to the body portion of the bracket. Set screws are provided for securing the brackets 12 and 13 in any adjusted position relatively to the bar 11, and the supporting portions of the brackets are such as to support the bar 11 in a horizontal position whenever the brackets rest on a level surface. This arrangement enables a quick check of the floor or other surface on which wheel tests are to be made, and the trammel bar may be moved about to various positions on the floor until a level portion is found, a carpenter's spirit level or similar instrument being laid flat on the upper surface of the trammel bar while the level surface is being sought. Since it is necessary for the front wheels of the vehicle being tested to be absolutely level in order to secure correct caster and camber readings, this use of my improved trammel bar will readily be appreciated.

Slidably mounted on the bar 11 is an adjustable bracket 14 having an offset portion 14A extending in the same direction from the bar 11 as the offset portion 12A of the bracket 12, and carrying an upright portion 14B at the upper extremity of which is mounted a plate 14C having a portion formed as a journal for a traveling gauge bar 14D. The plate 14C carries a graduated scale 14E over which a pointer 14F attached to the gauge 14D moves to enable a ready reading of the movements of the traveling gauge bar 14D. A set screw 14G is also provided in position to lock the gauge bar 14D in any desired adjusted position.

My improved trammel bar with its several brackets as above described, is particularly useful in the determination of the toe-in positioning of vehicle front wheels. In determining such toe-in, the trammel bar is preferably first placed against the rear portions of the front wheels in substantially the position shown in Fig. 7, with the adjacent surface of the trammel bar 11 contacting the treads of both wheels and with the bracket 12 arranged with its extended portion 12A contacting the inner side of one tire substantially as shown. The traveling gauge bar 14D is then secured by the set screw 14G with its pointer registering with zero indication centrally of the graduated scale 14E and the bracket 14 is then slid along the bar 11 until the face of the gauge bar 14D contacts the outer side of the other tire.

The trammel bar with the brackets 12 and 14 secured by their set screws in the adjusted positions as so determined is then removed from its position in the rear of the front wheels and placed into position at the front of such front wheels, substantially as shown in Fig. 6. It will be noted that the adjacent surface of the bar 11 is again brought into contact with the treads of both wheels and the bracket arm 12A into contact with the inner side wall of one tire. Such positioning will immediately determine whether or not the front wheels have any toe-in, for if they have, the face of the traveling gauge 14D will be separated from the side wall of the opposite wheel, and to determine the amount of such toe-in, it is only necessary to release the set screw 14G and slide the gauge bar 14D towards the wheel until it contacts the outer side wall of the tire. The amount of toe-in can then be read on the indicating scale 14E. The simplicity of this arrangement will immediately be apparent, and its accuracy is evidenced by the fact that straight line positions of the trammel bar are assured by virtue of contacting the treads of both wheels, while the tire sides are always contacted by the bracket arm 12A and gauge bar 14D at the same height.

To determine wheel wobble or bent wheel conditions, the points at which the above measurements were made are marked on the wheels, and then the car is rolled forward one-half turn of the wheels. The measurements are then repeated at the back and front of the front wheels and the differences, if any, noted. It will also be noted that the car owner, or the mechanic's superior, can readily check the reading at any position.

My improved trammel bar is also useful in ascertaining the steering geometry of the vehicle's front wheels, or what is sometimes known as turning radius run-out. With this in view, I utilize the trammel bar with its inner face contacting the treads of the wheels as a base line from which to accurately measure the angle of wheel turn-out when check readings are made. Such angle gauge is shown in Fig. 8 and comprises a base plate 15 having an upstanding flange 15A at right angles to the plate for use as a guide in positioning the plate for checking purposes. An elongated swinging member 16 is pivoted, as at 17, adjacent one corner of the plate 15 and carries adjacent its pivoted end a pointer 18 cooperating with a radially marked indicating scale 19 to show the angle of the swinging member 16 relatively to the base plate. The zero position on the scale is preferably when the member 16 is at right angles to the flange 15A of the base plate and graduations extend on opposite sides of such zero position. A handle 20 is secured to the member 16 for convenient swinging movement as desired.

When it is desired to ascertain the steering geometry of the vehicle's front wheels, the trammel bar 11 is arranged adjacent the fronts of the wheels then turned, say to the left, until the right-hand wheel is set at a 15° angle. To ascertain this angle exactly, the trammel bar is placed to contact with the fronts of the wheels, and the flange 15A of the angle gauge placed against the trammel bar substantially as shown in Fig. 8. The swinging member 16 is then moved into contact with the side wall of the tire and the angle of turning of the wheel may readily be read on the scale 19. After the right-hand wheel is accurately set at the desired angle, say 15°, as for example shown in Fig. 9, the position of the trammel bar is reversed and the angle gauge similarly placed to contact the side wall of the left-hand wheel to read its angular position. While steering geometry will vary with car models, the angle of the left-hand wheel in the above cited instance should read 18° plus or minus 1°, and variations from this reading will indicate a bent radius rod on the left-hand wheel. Similarly, the steering geometry of the opposite wheel can be ascertained by then turning the wheels to the right until the left-hand wheel sets at a 15° angle as measured by the angle gauge. Then reverse the position of the trammel bar, and with the angle gauge, read the angle of the right-hand wheel. This should read 18° plus or minus 1°, and variations from this reading indicate a bent radius rod on the right-hand wheel.

The simplicity and ease of thus checking the steering geometry with factory specifications will readily be noted, and also that after a bent radius rod has been replaced, the front end can be rechecked quickly and positively.

To ascertain the camber and caster of vehicle front wheels, I preferably use the protractors shown in Figs. 2 to 5 inclusive. Each protractor comprises a cross bar 21 adapted to be secured to a vehicle wheel, as by utilizing one of the threaded bolts ordinarily used for securing the wheels. A protractor lug nut clamp 22, substantially as shown in Fig. 10, is secured onto the wheel bolt by removing the ordinary nut thereof and passing the bolt through the aperture 22A of the clamp and then replacing the nut. The cross bar 21 is provided with a central apertured portion adapted to pass over the elongated stem of the clamp 22, and a wing nut 22B used to hold the bar 21 into contact with the side wall of the wheel tire. The bar 21 is usually attached to the wheel stud then above and to the rear of the wheel center and tightened by the wing nut just sufficiently to hold the bar 21 against the tire wall without flattening the tire. The bar should be set at an angle across the wheel so as to avoid the tire bulge where the tire contacts the floor. It will stay in place when thus positioned, without deformation of the tire.

Adjacent one extremity, the bar 21 carries a pivot pin 23 about which is journaled for free turning movement an elongated plate 24, the lower extremity of which is preferably formed with bent portions, substantially as shown in Figs. 4 and 5, for mounting and adjusting a plate 25, adjacent the upper extremity on which is mounted a graduated scale 26. The plate 25 carries a forwardly extending arm 27 tapped to receive the threaded screw 28 journaled in lugs 29 at the sides of the plate 24, and carrying knurled heads 28A at its opposite ends for ease in adjusting the position of the plate 25 cross-wise of the plate 24. For accurately centering the plate 25, and its attached scale 26, I provide a suitably placed aperture 25A in the plate 25 for reception of a dowel at the end of the screw 30 suitably threaded in an upturned front portion of the plate 24. For cooperation with the graduated scale 26, I provide a pendulum 31 pivoted adjacent the upper extremity of the plate 24, substantially as shown in Fig. 5, and having an aperture 31A adjacent its lower extremity across which is drawn a reading wire 32.

By virtue of this construction, my improved protractor may be quickly positioned upon a vehicle wheel with the pivot pin 23 above the hub and the plate 24 and attached portions will assume a perpendicular position substantially as shown, while the pendulum 31 will likewise assume a straight line position while remaining in position to swing across the plate 24 and its attached scale 26, the reading wire 32 carried by the pendulum swinging across the scale 26.

To ascertain camber, the protractors are secured to the opposite front wheels, and the graduated scale on both protractors are centered by means of the screw 30 being doweled in the aperture 25A of the plate 25. The wheels are then set straight ahead (using the angle gauge 15 if necessary) and then the camber of each wheel can be read on the graduated scale directly behind the hair line 32 of the swinging pendulum. When the line is between the wheel and the central zero mark on the scale 26, the camber is negative. When the hair line is outside the zero mark, the camber is positive.

To ascertain the caster of vehicle front wheels, the protractors are secured onto both front wheels as described in the ascertaining of camber, the wheels are then turned as far as they will go in one direction, say to the left, then the screw 30 is threaded forwardly to withdraw its dowel end portion from the aperture in the plate 25 and the scale 26 is adjusted by turning the side adjusting screw 28 sufficiently to bring the central zero mark of the scale into exact alignment with the hair line on the swinging pendulum. The wheels are then swung in the opposite direction, say to the right, as far as they will go. The caster may now be read directly on the graduated scale behind the hair line of the pendulum, and with the central zero mark such scale will show if the wheel has a plus or minus caster.

Each wheel is checked separately on its own protractor.

The simplicity and ease of obtaining camber and caster readings will be apparent, and the simultaneous application of the protractors to both front wheels for this purpose aids materially in securing correct and uniform results.

After adjustments are made for correcting camber or caster positions of the wheels, similar readings can be made to determine whether further adjustment is necessary with practically no loss of time.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. Means for ascertaining the camber and caster positions of vehicle front wheels comprising a protractor adapted to be secured to a vehicle front wheel at a point remote from the hub of the wheel, including a cross bar adapted to be removably secured to the wheel, a pivot pin on said crossbar extending outwardly from the wheel at right angles to the longitudinal centerline of the wheel, a plate pivotally suspended from said pin, an indicating scale loosely mounted upon said plate adjacent its lower extremity for sliding movements parallel with the plate, manually operated releasable means for centering said loosely mounted indicating scale upon said plate, a pendulum pivotally mounted upon said plate adjacent its upper extremity for swinging movements in the vertical plane of said pin, said pendulum carrying an index cooperating with said scale, and means for sliding said scale across the plate to register its zero indication with the then position of the index of the pendulum.

2. Means as recited in claim 1 wherein said scale is calibrated with a central zero indication and the pendulum is mounted on said plate in position to enable its index to swing to opposite sides of said zero indication in various adjusted positions of the scale.

3. Means as recited in claim 1 wherein said scale adjusting means include a bolt rotatably mounted on said plate and an apertured projection on said scale threaded to receive said bolt.

CHARLES I. FIELDS.